A. R. THOMPSON.
PRESSURE COOKER.
APPLICATION FILED SEPT. 29, 1920.
1,385,594. Patented July 26, 1921.
5 SHEETS—SHEET 1.
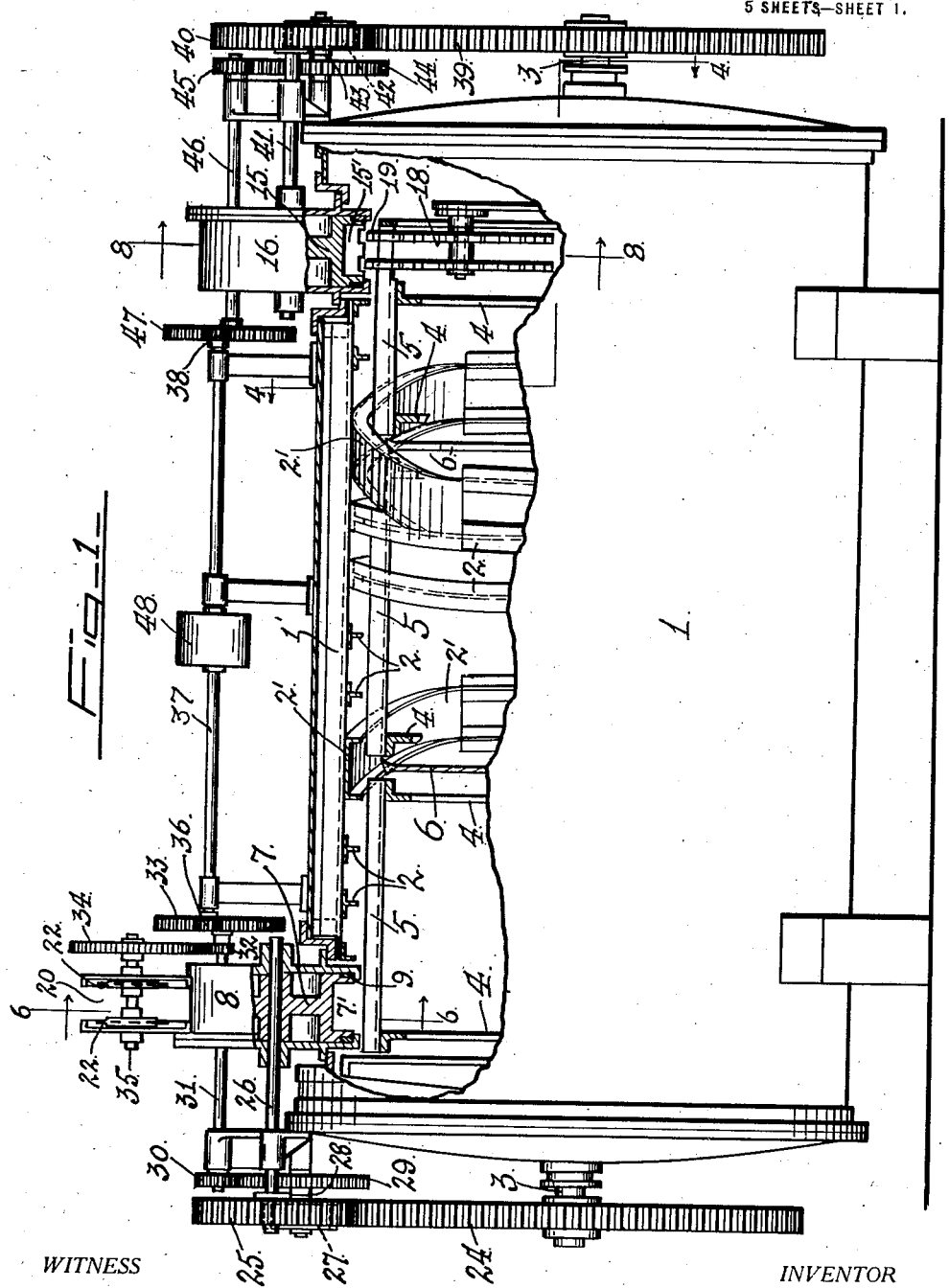
WITNESS
Wm G. Drew
INVENTOR
Albert R. Thompson
BY
Booth & Booth
ATTORNEYS A. R. THOMPSON.
PRESSURE COOKER.
APPLICATION FILED SEPT. 29, 1920.
1,385,594.
Patented July 26, 1921.
5 SHEETS—SHEET 2.
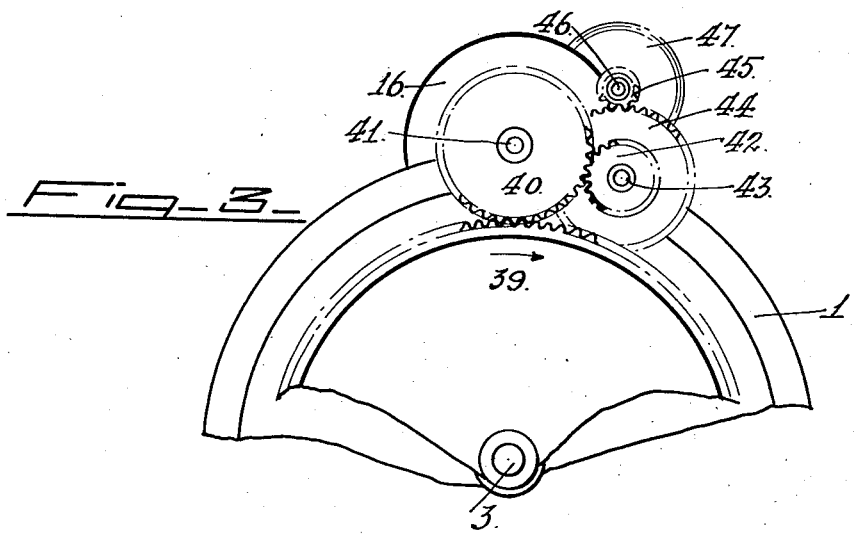
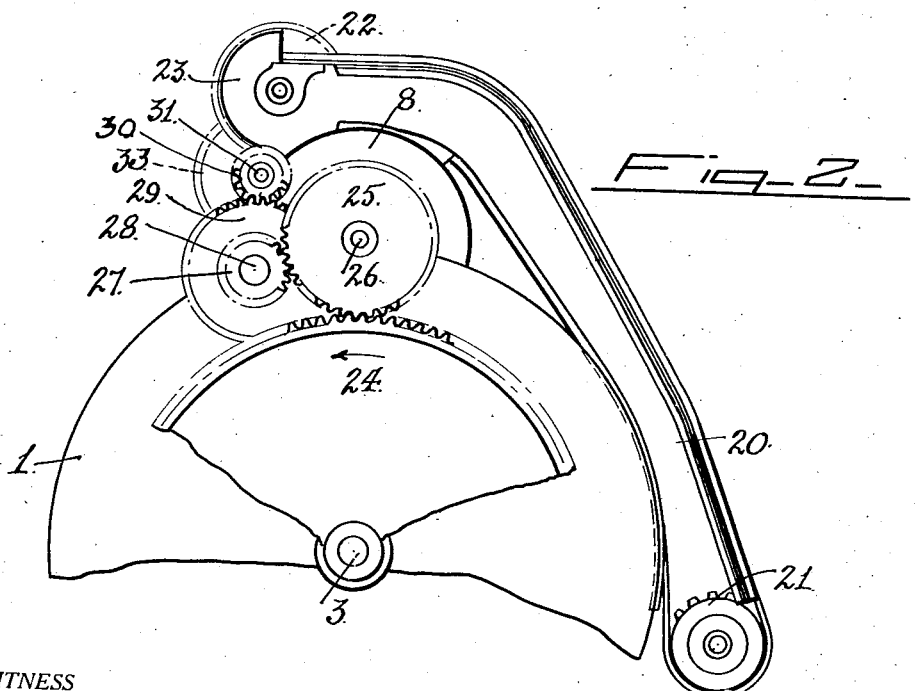
WITNESS
Wm G. Drew
INVENTOR
Albert R. Thompson
BY
Booth & Booth
ATTORNEYS

A. R. THOMPSON.
PRESSURE COOKER.
APPLICATION FILED SEPT. 29, 1920.

1,385,594.

Patented July 26, 1921.
5 SHEETS—SHEET 3.

WITNESS

INVENTOR
Albert R. Thompson
BY
Booth & Booth
ATTORNEYS

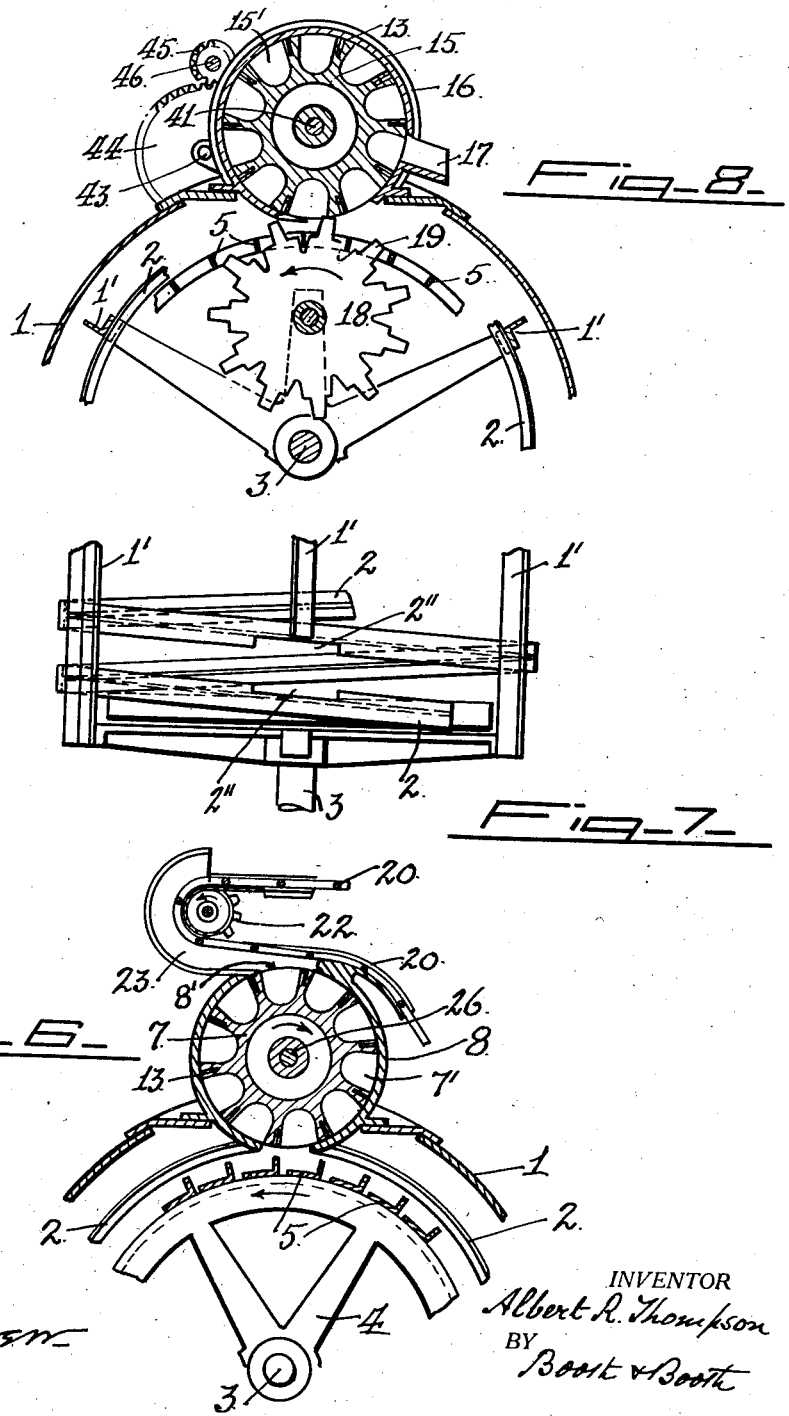

A. R. THOMPSON.
PRESSURE COOKER.
APPLICATION FILED SEPT. 29, 1920.
1,385,594.
Patented July 26, 1921.
5 SHEETS—SHEET 5.
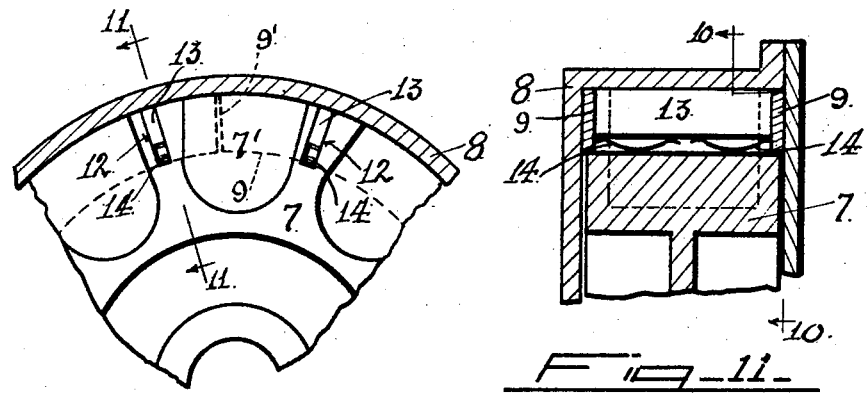
Fig. 10.
Fig. 11.
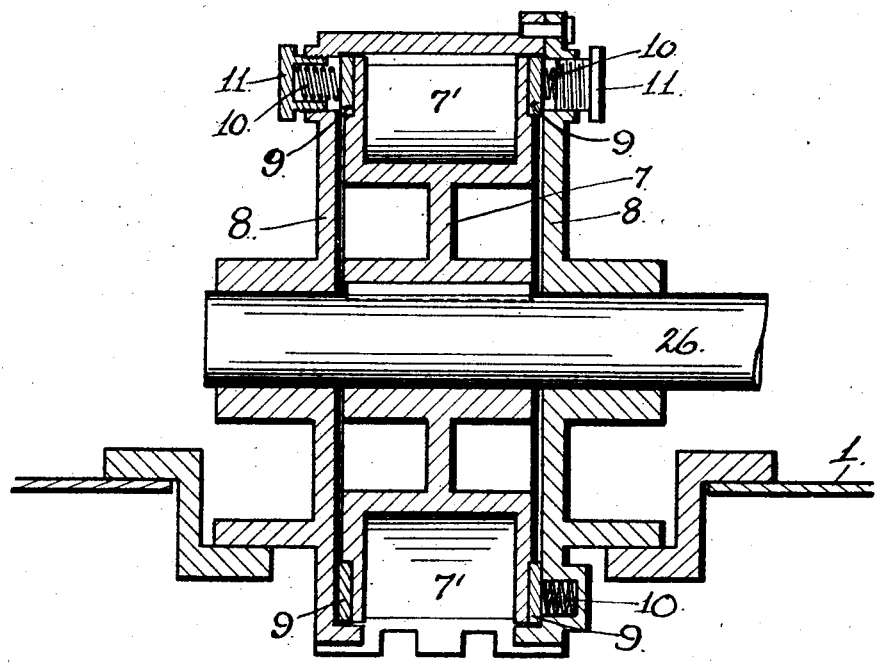
Fig. 9.
WITNESS
Wm G. Drew
INVENTOR
Albert R. Thompson
BY
Booth & Booth
ATTORNEYS

__UNITED STATES PATENT OFFICE.__

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

PRESSURE-COOKER.    REISSUED

1,385,594.    Specification of Letters Patent.    Patented July 26, 1921.

Application filed September 29, 1920. Serial No. 413,589.

*To all whom it may concern:*

Be it known that I, ALBERT R. THOMPSON, a citizen of the United States, residing at San Jose, in the county of Santa Clara and State of California, have invented certain new and useful Improvements in Pressure-Cookers, of which the following is a specification.

My invention relates to the class of pressure-cookers for canned goods. One of the objects of my invention is to provide simple and effective packing for the feed and discharge valves, to render them fluid tight. Another object is to provide a driving mechanism for the moving parts which shall insure their timely operation.

Another object is to provide for an accurate feed of the cans to the feed-valve.

Another object is to provide for the positive discharge of the cans from the top of the cooker-shell, into and through the discharge valve.

With these and other objects in view, my invention consists in the novel pressure cooker which I shall now fully describe by reference to the accompanying drawings in which—

Figure 1 is a side view, broken, and partly in section, of my pressure cooker.

Fig. 2 is an elevation, broken, of the feed end of the cooker.

Fig. 3 is an elevation, broken, of the discharge end of the same.

Fig. 6 is a vertical section of the feed inlet on the line 6—6 of Fig. 1.

Fig. 7 is a top plan view of a detail showing the cuts in the helical guide-rail to admit the cans from the inlet valve.

Fig. 8 is a sectional detail of the can discharge on the line 8—8 of Fig. 1.

Fig. 9 is a vertical section, enlarged, of the valves, either the feed or the discharge valve, showing the packing thereof.

Fig. 10 is a fragmentary side detail on the line 10 of Fig. 11, showing the rim packing of the valves.

Fig. 11 is a section on the line 11—11 of Fig. 10.

Figure 4:
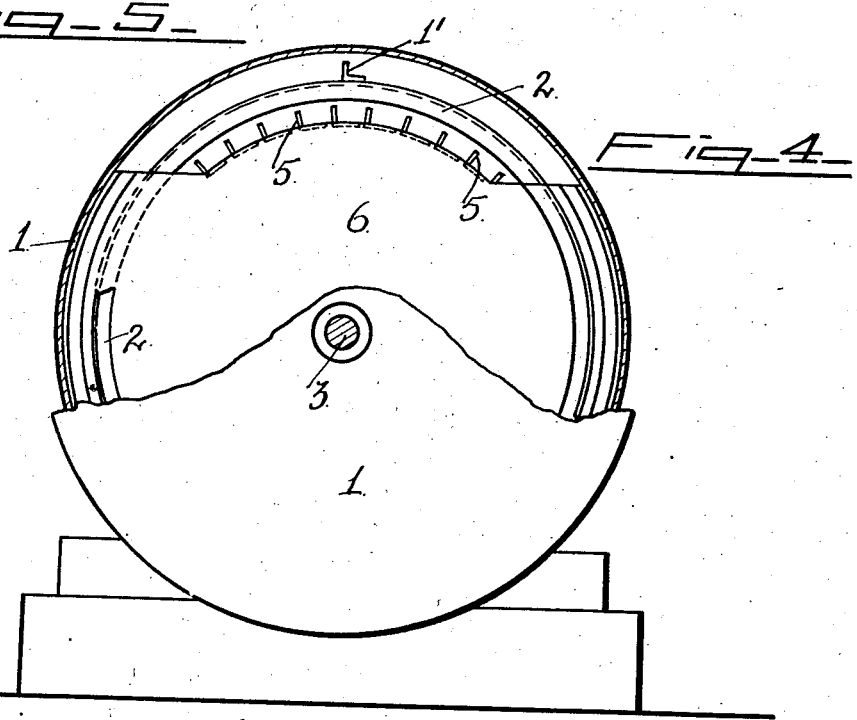
Fig. 4 is a sectional view on the line 4—4 of Fig. 1.

1 is a fluid tight box or shell. Within the shell in the region of its inner circumference is suitably mounted and supported by longitudinal stringer rails 1', a fixed helically directed rail 2, which is preferably of T-section with its leg portion projecting inwardly. 3 is a rotatable shaft mounted in the axis of the shell and carrying three pairs of spiders 4 which have secured to their rims the annular series of reel rails 5, said rails alining throughout the three reels. The rails are of angle section and they lie and rotate within the helically directed rail 2 in such relation thereto that a can introduced at one end of the shell will lie between the rails and will be directed thereby, by the rotation of the reels throughout a continuous helical path to the other end of the shell. Within the shell are two partitions 6—Fig. 1, which occupy the full cross section of the shell, except at the upper portion, where, as shown in Figs. 1 and 4 they terminate short of the upper arc of the shell, thereby forming in the shell three successively communicating compartments.

Figure 5:
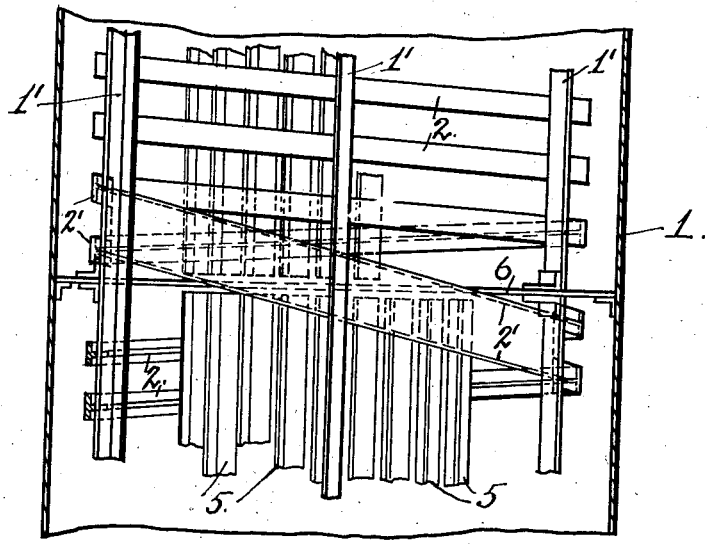
Fig. 5 is a top plan view looking down on the interior of the shell in the vicinity of one of the partitions, showing the accelerated pitch of the helical rail.

The fixed helical rail 2 where it passes over the tops of the partitions 6 has its pitch accelerated as seen at 2' in Figs. 1 and 5, so that the cans will be advanced over the open tops of the partitions during the time they are being carried by the reel in that vicinity. I may state at this point that the general construction of a helical can path formed by a rotating reel associated with a fixed helically directed rail is a well known type of path, and its disclosure herein is merely illustrative of any form of cooker in which there is a rotatably driven member in connection with the can advancing instrumentality of the machine. I may also state that the interior division of the shell into compartments successively communicating, and the acceleration of the can path over the divisional partitions are features which form no part of my present application (being included in a separate application) and are shown herein merely as illustrative of a pressure cooker to which the improvements and inventions hereinafter disclosed and claimed may be applied.

I have not deemed it necessary to show herein the means for imparting heat to the shell interior. The media for this purpose may be water or steam or air; nor is there need to show means for effecting and maintaining pressure, as such pressure may be the result of the steam directly generated in the shell by a water content, or of steam or air under pressure introduced therein.

With this explanation, I shall now describe my improvements. These, as before stated, concern the packing of the valves; the tying together or, as it may be termed, the unification of the driving means, in order to insure the timely operation, without torque or lagging, of all the moving parts; the accurate feeding of the cans to the feed valve; and the positive discharge of the cans from the top of the cooker into and through the discharge valve.

The feed valve, indicated by 7, is a cylindrical member, having a series of can pockets 7' in its periphery. This valve is relatively freely housed in a casing 8, having an opening in its bottom leading into the main shell 1, and adapted to drop a can through a cut out at 2'' of the fixed rail 2, Fig. 7, onto the underlying reel rails 5 in the first compartment of the shell, as shown particularly in Fig. 6. The valve by being relatively freely mounted in the casing, except for its yielding or resilient packing is not liable to the undesirable effects of changes in temperature to which, particularly in a cooker it is exposed, so that it will not "freeze" under expansion. But being thus generally free of its housing, it is nevertheless required to be packed to render it fluid tight and avoid relief of pressure in the shell. This packing is relatively of small extent, but is subject throughout to resilient pressure, so that it is both effective and not unduly frictional. The packing is shown in Figs. 9, 10 and 11. Fitted to a rabbet seat in each side of the valve at its outer circumference, is a packing ring 9. This ring is pressed to its seat in the valve by springs 10, and said ring is severed or split at 9' as shown in Fig. 10, and is of a springy nature, so that it resiliently presses its circumference against the inner surface of the casing 8. The springs 10 are housed in the casing 8, and these housings may if desired be in the form of screw glands 11, to adjust the pressure on the packing rings. Thus the rings 9 provide for a resilient side packing. To pack the rim of the valve there is slidably inserted in radial grooves 12 of the valve between the pockets 7', the packing plates 13, (Figs. 10 and 11) which are held out against the inner circumference of the casing 8, by underlying springs 14. As will be seen the width of the packing plates 13 is greater than that of the opening from the valve casing into the cooker shell 1, so that said plates straddle the opening and are thereby prevented from dropping out.

The discharge valve, shown in detail in Fig. 8, is a cylindrical member 15 with circumferential pockets 15'. It is housed in a casing 16, having a bottom opening in communication with the reel of the last compartment of the shell 1. The casing 16 also communicates with a discharge chute 17, Fig. 8. This discharge valve is packed in its casing similarly to the packing of the feed valve heretofore described, and fully illustrated in Figs. 9, 10 and 11. The cans are positively delivered to the discharge valve by the means shown particularly in Figs. 8 and 1, and consisting of a double rotatable wheel 18, having pusher teeth 19, which engage with the reel rails 5, whereby said wheel is automatically rotated. These teeth by projecting through the inter-rail spaces and impinging on the cans near each end positively and evenly lift the cans into the pockets of the valve, and thus provide means for discharging cans from the top of a cooker in which the discharge valve overlies the cooker shell.

The cans are supplied to the feed valve by means of an elevator 20 shown in Figs. 2 and 6. The foot of the elevator is mounted on a sprocket 21, and its head passes over a sprocket 22. A curved chute 23, Fig. 6, is located about the head bight of the elevator and communicates directly with the receiving opening 8' in the valve casing 8. By means of this reversed chute, the return course of the elevator, as clearly shown in Fig. 6, is utilized to positively carry the cans to the receiving opening 8' and thus accurately time their delivery to the rotation of the valve, into the pockets of which they drop with precision. The improvement in the driving mechanism is shown in Figs. 1, 2 and 3.

Upon the shaft 3, which rotates the reel members of the can path within the shell 1, is a large gear 24 at the inlet end of the cooker. This gear meshes with a smaller gear 25 on the shaft 26 which carries and rotates the feed valve 7. The gear 25 meshes with a pinion 27, Fig. 2, on a counter shaft 28, which carries a gear 29. Gear 29 meshes with a pinion 30, on a counter shaft 31, the other end of which (Fig. 1) carries a pinion 32 and a gear 33. The pinion 32 meshes with a gear 34 on the shaft 35 of the head sprocket 22 of the elevator 20 whereby the latter is driven. The gear 33 meshes with a pinion 36 on one end of a shaft 37, extending lengthwise of the machine and carrying on its other end a pinion 38.

In Figs. 1 and 3, 39 is a large gear on the discharge end of the reel shaft 3. This meshes with a gear 40 on the shaft 41 of the discharge valve 15. The gear 40 also meshes with a pinion 42, Fig. 3, on a counter-shaft 43, which also carries a gear 44. Gear 44 meshes with a pinion 45 on a counter shaft 46, the other end of which carries a gear 47 (Fig. 1) which meshes with the pinion 38 on the shaft 37. Upon the shaft 37 midway of its length is the driving pulley 48, through which power is led into the machine. The shaft 37 is driven at a relatively high speed, which diminishes its tendency to spring, due to torsion, and as both ends of the machine are driven by this shaft, any torsional strain which may take place will be distributed equally, assuming that said ends require the same amount of driving power. Furthermore, due to the relatively high speed of the driving shaft 37, and the large gear-reduction, any spring due to torsion will be materially reduced in direct relation to the amount of gear reduction. It will also be seen that the valves, which revolve at a relatively higher rate of speed than the reel within the cooker, are primarily driven, and the power is thence transmitted to drive the reel at both ends, which insures the relatively timely movements of both the valves and the reel.

In the common practice of primarily driving the reel at one end only, and then in turn gearing up to the valves at each end of the cooker, the spring due to torsion in the relatively long reel-shaft is multiplied by the increased speed through the gear-train to the discharge valve, with the result that the latter revolves at varying speed. Cookers of this type are relatively long machines, and it is important that the drive shall be as free from spring or torque as possible in order that all moving parts shall operate in accurate time.

By my improvement, these parts being included in one endless train of transmission, the power being applied midway and thence extending to and through both ends and the motion reduced as required, all strains are equalized and the necessary relative times preserved.

I claim:—

1. In a pressure cooker, and in combination with its shell, and means for advancing canned goods therethrough, a can-passing valve-structure comprising a casing communicating with said shell, and a rotatable valve-member within said casing, provided with a peripheral series of can-pockets, adapted to be brought successively into register with the communication between the casing and shell; and packing rings mounted in the casing with their faces yieldingly fitted to the sides of said valve member, and their rims yieldingly fitted to the inner surface of the casing periphery.

2. In a pressure cooker, and in combination with its shell, and means for advancing canned goods therethrough, a can-passing valve-structure comprising a casing communicating with said shell, and a rotatable valve-member within said casing, provided with a peripheral series of can-pockets, adapted to be brought successively into register with the communication between the casing and shell; split-spring-rings carried by the casing, said rings having their rims resiliently bearing on the inner surface of the casing periphery and their faces bearing against the sides of the valve member, and springs for holding said faces resiliently to said valve-member.

3. In a pressure-cooker, and in combination with its shell, and means for advancing canned goods therethrough, a can-passing valve-structure comprising a casing communicating with said shell, and a rotatable valve-member within said casing, provided with a peripheral series of can-pockets adapted to be brought successively into register with the communication between the casing and shell; packing plates slidably mounted radially in the periphery of said valve member between its pockets, and springs behind said plates for pressing them against the inner circumference of the casing.

4. In a pressure-cooker, and in combination with its shell, and means for advancing canned goods therethrough, a can-pressing valve-structure comprising a casing communicating with said shell, and a rotatable valve-member within said casing, provided with a peripheral series of can-pockets adapted to be brought successively into register with the communication between the casing and shell; and packing plates slidably mounted radially in the periphery of said valve member between its pockets, and yieldingly fitting against the inner circumference of the casing, said plates having a width greater than the width of the communication between the casing and shell, whereby they are held in their radial seats in the valve-member.

5. In a pressure cooker, and in combination with its shell, and means for advancing canned goods therethrough; a can-passing valve structure comprising a casing communicating with said shell, and a rotatable valve-member within said shell provided with a peripheral series of can pockets, adapted to be brought successively into register with the communication between the casing and shell; and means for packing said rotating valve-member in said casing to render the valve-structure fluid-pressure tight consisting of split spring-rings mounted in the casing and yieldingly fitting their faces to the sides of said valve member and their rims to the inner surface of the casing periphery, and packing plates slidably mounted radially in the periphery of said member and yieldingly fitting against the inner circumference of the casing.

6. In a cooker, the combination of a sterilizing shell; a movable member in the shell for advancing cans therethrough; a movable can-inlet valve to feed the cans to the shell;

a movable can-discharge valve to deliver the cans from the shell; a drive shaft; power-transmitting, speed - reducing connections from each end of said drive shaft to the can-inlet and can-discharge valves respectively; and power-transmitting, speed-reducing connections from said valves to each end respectively of the can-advancing member within the shell.

7. In a cooker, the combination of a sterilizing shell; a rotatable member therein for advancing cans therethrough; a rotatable can-inlet valve to feed the cans to the shell; a traveling elevator to supply the cans to the inlet-valve; a rotating can-discharge valve to deliver the cans from the shell; a drive shaft; power-transmitting, speed-reducing connections from each end of said drive shaft to the can-inlet and can-discharge valves respectively; power-transmitting, speed-reducing connections from said valves to each end respectively of the can-advancing member within the shell; and power-transmitting connections from the inlet-valve to the elevator.

8. In a cooker, the combination of a sterilizing shell; a rotatable member therein for advancing the cans therethrough; a rotatable can-inlet valve at one end of the shell, to feed the cans thereto; a rotatable can-discharge valve at the other end of the shell, to deliver the cans therefrom; a shaft extending through the axis of the shell to rotate the can-advancing member; a drive-shaft extending longitudinally of the shell; and power-transmitting mechanism connecting the ends of the drive shaft with the can-inlet and can-discharge valves respectively, and with the respective ends of the shaft of the can-advancing member in a single endless train, said power-transmitting mechanism having a speed reduction from the drive shaft to the valves and thence to the shaft of the can-advancing-member.

9. In a cooker, the combination of a sterilizing shell; a rotatable can-advancing member therein; a rotatable can-inlet-valve at one end of the shell; a rotatable can discharge valve at the other end; a shaft extending through the shell to rotate the can advancing member; a shaft to rotate the can-inlet-valve and a shaft to rotate the can-discharge-valve; a drive shaft extending longitudinally of the shell; a speed reducing train of gears between the ends of the drive shaft and the valve shafts respectively and a train of speed reducing gears between the respective valve shafts and the respective ends of the shaft of the can-advancing member.

10. In a cooker, and in combination with its shell and means for advancing cans therethrough; a rotatable can-inlet-valve having a peripheral series of can-receiving pockets; an endless traveling elevator the head bight of which extends over and beyond said valve, with its return course passing directly above the pockets of said valve and continuing thence on the same side of the shell as its direct course; and a fixed guide about the head bight of the elevator, coacting with the return course thereof to positively carry the cans successively into timely registry with successive valve pockets, and place them therein.

11. In a cooker and in combination with its shell and a rotating rail-reel-member for advancing cans therethrough; a rotatable can-discharge valve associated with the top of the shell, and adapted to receive the cans from the reel member; and a rotatable can discharge member within the shell underlying the discharge valve and within the circumference of the reel member, said discharge member having peripheral teeth rotatably engaging the rails of the reel member and adapted to project therebetween and push the cans therefrom into the discharge valve.

12. In a cooker, and in combination with its shell, having within it a fixed helically directed rail and an associated rotatable rail-reel-member comprising a can track upon which the cans are advanced by the rotation of the rail-reel-member; a rotatable can-discharge valve with a peripheral series of can-pockets, said valve being associated with the top of the shell, in position to receive in its pockets the cans from the end of the can-track; and a rotatable can-discharge member within the shell, underlying the discharge valve and within the circumference of the reel-member, said discharge member having peripheral teeth engaging and projecting between the rails of the reel-member to rotate said discharge member and to lift the cans therefrom into the pockets of the discharge valve.

13. In a cooker and in combination with its shell and a rotatable rail-reel member comprised in a means for advancing cans through the shell; a rotatable can-discharge valve with a peripheral series of can-pockets, said valve being associated with the top of the shell in position to receive in its pockets the cans from rails of the reel-member; and a rotatable can discharge member within the shell, underlying the discharge valve and within the circumference of the reel-member, said discharge member having a spaced double series of peripheral teeth engaging and projecting between the rails of the reel-member to rotate said discharge member and to impinge upon the cans to lift them uniformly from the rails and place them in the pockets of the discharge valve.

In testimony whereof I have signed my name to this specification.

ALBERT R. THOMPSON.